3,073,885
INSULATING AND COOLING ARRANGEMENT
FOR ELECTRICAL APPARATUS
Guglielmo Camilli, Pittsfield, Mass., assignor to General Electric Company, a corporation of New York
Filed Sept. 28, 1960, Ser. No. 59,068
9 Claims. (Cl. 174—15)

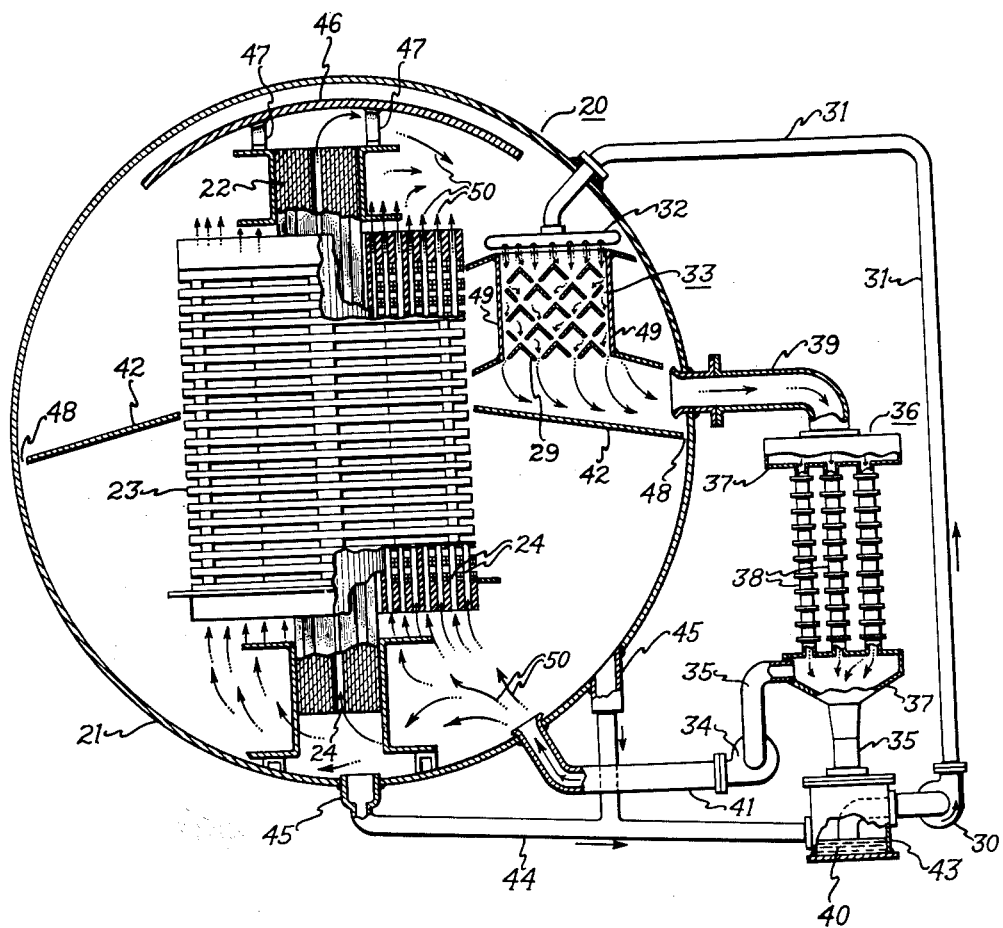

This invention relates to electrical apparatus, and more in particular to an improved insulating and cooling arrangement for such apparatus employing fluid dielectric material.

The art of cooling electrical apparatus with vaporizable dielectric fluids has progressed to the state where many organic compounds having an effective dielectric strength and a boiling point sufficiently low to be useful under the operating pressure and temperature conditions encountered by such apparatus are well known. The expression "vaporizable dielectric fluid" is defined as a material or combination of materials having good electrical insulating properties such as dielectric strength, corona quenching effect, and voltage breakdown strength, said materials being stable under the operating conditions of the electrical apparatus and having no significant deteriorating effect on other materials employed in the apparatus; and the fluid must have a condensation temperature at which it changes from gas to liquid and vice versa that is low enough to be below the temperature at which solid insulation in the apparatus will be damaged yet high enough to be within the range of normal operating temperatures of the apparatus.

According to the known arrangements for employing vaporizable dielectric fluids for cooling and insulating electrical apparatus, a heat generating current carrying member in the apparatus, such as the core and coils of a transformer, is sprayed with the vaporizable dielectric fluid in its liquid state so that a thin film or layer of the liquid flows over the hot current carrying member; the heat given off by the current carrying member evaporates the liquid and thus cools the apparatus. The heat absorbed by evaporation of the liquid is dissipated when the vapor condenses on the sides of the enclosure or in external heat exchangers. A non-condensable gas, such as nitrogen or sulfur hexafluoride, may also be employed in the apparatus containing enclosure for providing insulation for the electrical apparatus at all temperatures. Thus, the total dielectric strength of the fluid insulating medium for the electrical apparatus is a combination of the strength of the non-condensable gas and that of the vaporized fluid.

Although the above combination of non-condensable and condensable fluids has provided excellent results as far as cooling the apparatus is concerned, problems have arisen in the use of such apparatus because the breakdown voltage strength of the fluid mixtures has not been satisfactorily predictable and has not always been as high under actual operating conditions as it is under laboratory test conditions. For example, tests have revealed that the combination of known non-condensable gases with some of the vaporized fluids have sufficiently high dielectric strength to be employed as the insulating medium in transformers of a given rating. However, when a transformer of the given rating insulated by one of the non-condensable gases has been cooled by flowing a liquid film of the vaporizable fluid thereover, breakdowns have occurred when the apparatus is operating at its rated voltage. One of the reasons for this lower than expected insulation breakdown is believed to be that the dielectric strength of the vaporizable fluid, when it is in the liquid state, is several times higher than that of the vaporizable fluid when it is in the gaseous state. Experiments have shown that when a gas having a given dielectric constant is combined with a layer of non-gaseous insulating material having a much higher dielectric constant, the gas breaks down at a lower voltage than it does when it is used by itself. The reason for this is believed to be that the unit stress on the gas is increased when it is combined with a non-gaseous layer of higher dielectric strength material. Therefore, it is believed that one of the main reasons why the insulating strength of apparatus cooled by flowing a film of vaporizable liquid thereover cannot be accurately predicted is that the liquid acts as a non-gaseous insulating layer having a higher dielectric constant than the gaseous insulation, and thus causes the gaseous insulation to break down at values lower than its expected breakdown voltage.

Accordingly, it is an object of this invention to provide improved electrical apparatus.

Another object of this invention is to provide improved insulating arrangements for electrical apparatus.

A further object of this invention is to provide an improved insulating arrangement for electrical apparatus employing a vaporizable dielectric fluid and a non-condensable gaseous dielectric medium.

Another object of this invention is to provide an insulating arrangement for electrical apparatus that is cooled by vaporizing a fluid dielectric material in which the fluid is prevented from contacting the electrical apparatus while it is in its liquid state.

Other objects and advantages of my invention will become apparent from a reading of the following specification and claims and an examination of the drawing.

Briefly stated, according to one aspect of my invention, a heat generating element of an electrical apparatus may be cooled by flow of a gaseous dielectric medium, the gaseous dielectric medium being cooled by evaporation of a vaporizable dielectric fluid, with the arrangement of elements being such that essentially none of the vaporizable fluid in the liquid state contacts the electrical apparatus. The gaseous dielectric medium and vaporized fluid also provide an insulating medium for the electrical apparatus.

The sole FIGURE in the drawing is a partially cross-sectional diagrammatic view of a transformer constructed in accord with the principles of my invention.

Referring to the drawing, the invention is illustrated by reference to a transformer 20 contained in a sealed enclosure 21. The transformer 20 may comprise a magnetic core 22 and an electrical winding 23, the core and winding being provided with axial ducts 24 to permit flow of the insulating and cooling fluid therethrough to absorb heat generated by the core and winding assembly. The winding 23 may be made from strands of conductor material wrapped with solid insulation in the conventional manner. The enclosure 21 may be provided with conventional accessories such as bushings and fluid expansion reservoirs, but such accessories have not been shown in order to simplify the drawing.

The insulating and cooling arrangement for the electrical apparatus may comprise means 30 for pumping a liquefied vaporizable dielectric fluid 40 through a conduit 31 to spray means 32. The spray means 32 is arranged to force a layer or film of the liquefied fluid 40 over an enlarged heat transfer surface 33, which may be a plurality of overlapping L-shaped channel members 29 spaced so as to permit the liquefied fluid 40 to flow thereover and become evaporated as heat is absorbed. The means 32 should be made from a good heat conducting material, such as aluminum, and it is to be understood that other arrangements that provide a large heat dissipating surface that also permits flow of a fluid therethrough, such as a plurality spaced metallic baffles having apertures therein or fine mesh wire screens, could also be employed without departing from the spirit or scope of the invention. Baffle means 49 may be provided for directing the flow of a gas 50 over the heat transfer surface 33.

The cooling and insulating fluid medium for the apparatus is circulated by blower means 34 which is chosen so as to have a capacity sufficient to provide a mass flow of gas sufficient to cool the apparatus within its predetermined operating temperature range. The blower means 34 could, for example, be a motor-driven propeller-type fan. The means 34 may have its intake side connected by a conduit 35 to heat exchanger or radiator means 36 located externally of the enclosure 21. The heat exchanger means 36 may comprise a pair of headers 37 connecting a plurality of finned radiator tubes 38 that provide a large surface area for dissipating heat. The heat exchange means 36 is connected by means of a conduit 39 to the interior of the enclosure 21, which is provided with suitable baffle means 42 surrounding the transformer assembly and arranged to direct flow of the insulating and cooling fluids into the conduit 39. The output side of the blower means 34 is connected by a conduit 41 to the enclosure 21, and the baffle means 42 also directs the flow of the cooling fluid through the transformer core and coil conduits 24. The baffle means 42 should be made from a non-metallic material to avoid insulation problems. However, if it is made from a metal, it should be provided with a gap to avoid producing a short circuited turn. Sump means 43 is provided for collecting any of the vaporized fluid 40 that condenses as it passes through the cooler 36. The intake side of the pump means 30 is connected to the sump means 43. The means 43 may also be connected by an inclined conduit 44 to other conveniently located sumps 45 for collecting any of the vaporized fluid 40 that condenses on the sides of the enclosure 21, baffle 42, or shield 46.

It should be noted that the baffles, shield, and enclosure are constructed and arranged so that any of the vaporized fluid 40 that condenses thereon will not flow or drip on the transformer core 22 or coils 23. This may be accomplished by constructing the enclosure 21 in a substantially cylindrical or spherical configuration, and the baffle means 49 and 42 should be arranged so that they are inclined away from the transformer core and coils toward the bottom of the enclosure 21. In order to prevent any of the vaporized fluid 40 from condensing on the enclosure 21 above the transformer and then dripping thereon, the transformer may be provided with a metallic shield 46 connected by means of metallic members 47 to the transformer core 22 or some other element in the transformer assembly that is in contact with the core so as to be heated thereby. Thus heat from the transformer core 22 will be conducted through the members 47 to the shield 46, which will thus be maintained at sufficiently high temperature that any vaporized fluid 40 in the stream of gas leaving the ducts 24 will not condense thereon. The shield 46 extends beyond the periphery of the transformer assembly and is arranged so as to slant away from the assembly. Thus any vaporized fluid 40 that condenses on the enclosure 21 above the shield 46 will be prevented from dripping on the transformer because it will first fall on the shield 46 and will then be vaporized or will flow beyond the ends of the transformer and fall off of the shield and on some other part of the apparatus such as the baffle 42. The baffle 42 is spaced slightly from the side of the enclosure 21 by a gap 48 in order to permit any liquid that condenses on the enclosure to run down its wall to the sumps 45.

The fluid cooling and insulating medium for the apparatus comprises a high strength dielectric gas 50 that is non-condensable in the normal operating temperature range of the apparatus. Sulfur hexafluoride and other electro-negative gases, and nitrogen, or a mixture of such gases may be satisfactorily employed as the gas 50.

The noncondensable gas 50, either by itself or when mixed with any of the vaporized fluid 40 that is not condensed in the heat exchanger 36, is forced through the ducts 24 by the blower means 34. The gas will remove heat from the transformer core and winding, and will then be cooled by giving up heat to the enlarged surface 33, the heat exchanger 36 and any other part of the apparatus, such as the enclosure 21, that is capable of dissipating heat to the atmosphere, and also by evaporating the spray of liquid 40. It will be apparent to those skilled in the art that by proper balancing of the area of the heat transfer surface 33, the heat dissipating capacity of the heat exchanger means 36, and the volume of gas flow with the expected operating temperatures and heat output of the electrical apparatus, a specific gas 50 and fluid 40 can be matched so that substantially all of the vaporized fluid 40 will be condensed in the heat exchanger 36.

Numerous suitable vaporizable dielectric fluids 40 are known to those skilled in the art and can be employed in practicing this invention. For example, some of the known fluorinated organic compounds having satisfactory properties within the operating ranges of dry-type electrical apparatus, such as boiling points between 50° C. and 225° C., which may be employed as the above-mentioned vaporizable fluids 40 are listed below.

| | Boiling point, °C. |
|---|---|
| Perfluorocyclic ether ($C_6F_{12}O$) | 52 |
| Perfluorobicyclo-(2.2.1) heptane (746 mm.) | 70 |
| Perfluorotriethyl amine | 71 |
| Perfluoromethylcyclohexane | 76 |
| Perfluoro-n-heptane | 82 |
| Monochloropentadecafluoroheptane | 96 |
| Perfluorodibutyl ether | 100 |
| Perfluoroethylcyclohexane | 101 |
| Perfluorodimethylcyclohexane | 101 |
| Perfluorocyclic ether ($C_8F_{16}O$) | 101 |
| Perfluorotoluene | 102 |
| Perfluorindane | 116 to 117 |
| Perfluoropropylcyclohexane | 123 |
| Chlorononafluorobis (trifluoromethyl)-cyclohexane | 129 |
| Monochlorotetrafluoro-(trifluoromethyl)-benzene | 137 |
| Perfluoronaphthalane | 140 |
| Perfluorodiethylcyclohexane | 148 |
| 2-chloro-1,4-bis(trifluoromethyl) benzene | 148 |
| 2-chlorotrifluoromethylbenzene | 150 |
| Perfluoro-1-methylnaphthalane | 161 |
| Dichlorotrifluoro-(trifluoromethyl) benzene | 170 |
| Perfluorotributyl amine | 178 |
| Perfluorodimethylnaphthalanes | 177 to 179 |
| Perfluorofluorane | 190 |
| Perfluorophenanthrane | 205 |
| Trichlorodifluoro-(trifluoromethyl) benzene | 207 |

The ethers and amines can have dissimilar halogen substituted hydro-carbon groups present, such as 2,2-dichloro-1,1,1-trifluoroethyl-perfluorobutylether and perfluorodibutylethylamine. The liquid compounds listed above have freezing points which are below zero degrees centigrade, and many have freezing points below −50° C. Thus the liquids can be employed safely either in mixtures or individually under nearly all ambient conditions to be expected in the use of the apparatus. Of the liquids described herein, perfluoromethylcyclohexane is one of the most suitable for the apparatus described. It has a boiling point of about 76.3° C., a specific heat of 0.2 calorie per gram, a density of 1.8, a freezing point below −50° C., and a heat of vaporization of 22 calories per gram at the boiling point. The above list is exemplary, since it does not contain all fluids suitable for practicing the invention and it is to be understood that the invention is not dependent on the use of any specific vaporizable dielectric fluid 40.

The particular vaporizable dielectric fluid 40 chosen for any specific apparatus must have a boiling point below the temperature at which solid insulation in the apparatus will be damaged, yet the boiling point should be sufficiently high that the fluid will condense as a liquid within the normal operating range of the apparatus. For example, if class A cellulosic material is employed as the insulation around conductors in the winding of a transformer, the boiling point of the fluid 40 should be below 105° C. For many power transformer ratings, perfluoromethylcyclohexane, which has a boiling point of approximately 76° C., would be satisfactory in the above example because it would condense as a liquid within the normal operating temperature range of the apparatus.

Vaporizable dielectric fluids of the class described above have a dielectric constant of about 2.5 when they are in the liquid state and dielectric constant of about 1 when they are in the gaseous state. The dielectric constant of sulfur hexafluoride gas is also 1. Experiments have shown that when a gas, such as sulfur hexafluoride, is placed between spaced electrodes and a layer of non-gaseous material having a dielectric constant higher than that of sulfur hexafluoride is also placed between the electrodes, the impulse breakdown voltage of the combination is lower than that of the sulfur hexafluoride when used alone, and lower than that of the non-gaseous dielectric material. The reason for this is believed to be that the placing of the high strength non-gaseous layer between the electrodes increases the effective volts per mil stress on the sulfur hexafluoride. This same phenomenon is believed to take place when a film or layer of the above-indicated vaporizable dielectric fluids 40 are flowed over parts at different electrical potentials of an electrical apparatus insulated by a gaseous medium. Since the thickness of the fluid film cannot be accurately determined, the resulting amount that the dielectric strength of the gaseous insulation will be lowered cannot be accurately predicted within satisfactory ranges.

It is thus apparent that the above-described arrangement of elements in the cooling and insulating system for an electrical apparatus in accord with the teachings of my invention will obviate the difficulties encountered when a film or layer of liquid is passed over the electrical apparatus because no liquid film can contact elements of the electrical apparatus that are at different potentials. Consequently, the insulating strength of the gaseous insulating medium can be accurately determined because it consists of a gas or combination of gases whose breakdown voltage for various electrode spacings can be predetermined. It will be understood, of course, that the current carrying parts of the apparatus may also be separated by solid insulation having a known thickness according to conventional practice. Furthermore, the desirable cooling effect of the vaporizable dielectric fluids will still be obtained, since liquefied fluid is sprayed over an enlarged heat transfer surface, and the gaseous medium that cools the apparatus is passed over the heat transfer surface and cooled thereby.

It will be understood, of course, that while the forms of the invention herein shown and described constitute preferred embodiments of the invention, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. An insulating and cooling system for high voltage electrical apparatus of the type having spaced elements at different potentials and a heat generating current carrying member in a sealed enclosure, said current carrying member being insulated by solid material, said current carrying member producing heat capable of heating the apparatus to a temperature at which said solid material will be damaged, said system comprising a high strength dielectric gas that is non-condensable in the operating temperature range of said apparatus, means for circulating said gas over said current carrying member so that it absorbs heat therefrom, means for cooling said gas comprising a heat transfer surface other than the surface of said current carrying member, means directing flow of said gas over said heat transfer surface, a vaporizable dielectric fluid having a boiling point below the temperature at which said solid material will be damaged, said boiling point being within the normal operating temperature range of said apparatus so that said dielectric fluid condenses as a liquid during operation of said apparatus, and means for applying a film of the liquefied fluid over said heat transfer surface for cooling the gas by evaporation.

2. An insulating and cooling system for high voltage electrical apparatus of the type having spaced elements at different potentials and a heat generating current carrying member in a sealed enclosure, said current carrying member being insulated by solid material, said current carrying member producing heat capable of heating the apparatus to a temperature at which said solid material will be damaged, said system comprising a high strength dielectric gas that is non-condensable in the operating temperature range of said apparatus, means for circulating said gas over said current carrying member so that it absorbs heat therefrom, means for cooling said gas comprising a heat transfer surface other than the surface of said current carrying member, means directing flow of said gas over said heat transfer surface, a vaporizable dielectric fluid having a boiling point below the temperature at which said solid material will be damaged, said boiling point being within the normal operating temperature range of said apparatus so that said dielectric fluid condenses as a liquid during operation of said apparatus, means for applying a film of the liquefied fluid over said heat transfer surface for cooling the gas by evaporation, and heat exchange means located externally of said enclosure for condensing the evaporated fluid.

3. In high voltage electrical apparatus of the type having spaced elements at different potentials, the combination comprising an enclosure, a heat generating current carrying member within said enclosure, solid insulating material in said enclosure, said current carrying member producing sufficient heat to raise the temperature of said apparatus above a temperature at which the said solid material will be damaged, a non-condensable gas of high dielectric strength in said enclosure, means for circulating said gas over said current carrying member so that said gas absorbs heat therefrom, means for removing the heat absorbed by said gas comprising an enlarged heat transfer surface other than the surface of said current carrying member, means directing the flow of said dielectric gas over said enlarged heat transfer surface, a vaporizable dielectric fluid having a boiling point below said temperature at which said solid insulating material will be damaged, said boiling point being within the normal operating temperature range of said apparatus, and means for spraying said fluid when it is liquefied over said enlarged heat transfer surface where the liquid is evaporated and cools said gas.

4. In high voltage electrical apparatus of the type having spaced elements at different potentials, the combination comprising an enclosure, a heat generating current carrying member within said enclosure, solid insulating material in said enclosure, said current carrying member producing sufficient heat to raise the temperature of said apparatus above a temperature at which the said solid material will be damaged, a non-condensable gas of high dielectric strength in said enclosure, means for circulating said gas over said current carrying member so that said gas absorbs heat therefrom, means for removing the heat absorbed by said gas comprising an enlarged heat transfer surface other than the surface of said current carrying member, external heat exchanger means, means directing the flow of said dielectric gas over said enlarged heat transfer surface, and then into said external heat exchanger means, a vaporizable dielectric fluid having a boiling point below said temperature at which said solid insulating material will be damaged, said boiling point being within the normal operating temperature range of said apparatus, and means for spraying said fluid when it is liquefied over said enlarged heat transfer surface where the liquid is evaporated and cools said gas.

5. In high voltage electrical apparatus of the type having spaced elements at different potentials, the combination comprising an enclosure, a heat generating current carrying member within said enclosure, solid insulating material in said enclosure, said current carrying member producing sufficient heat to raise the temperature of said apparatus above a temperature at which the said solid material will be damaged, a non-condensable gas of high dielectric strength in said enclosure, means for circulating said gas over said current carrying member so that said gas absorbs heat therefrom, means for removing the heat absorbed by said gas comprising an enlarged heat transfer surface other than the surface of said current carrying member, external heat exchanger means, means directing the flow of said dielectric gas over said enlarged heat transfer surface and then into said external heat exchanger means, a vaporizable dielectric fluid having a boiling point below said temperature at which said solid insulating material will be damaged, said boiling point being within the normal operating temperature range of said apparatus, means for spraying said fluid when it is liquefied over said enlarged heat transfer surface where the liquid is evaporated and cools said gas, and means for preventing vaporizable dielectric fluid that condenses on said enclosure from passing between said spaced elements at different potentials.

6. In high voltage electrical apparatus, the combination comprising a core and winding assembly sealed in an enclosure, said assembly having solid material insulating spaced members at different electrical potentials, said assembly producing heat sufficient to raise the temperature of said apparatus above a temperature at which said solid material will be damaged, there being fluid flow ducts extending through said assembly, a non-condensable high dielectric strength gas in said enclosure, blower means for circulating said gas through said ducts, said gas absorbing heat generated by said assembly as it passes through said ducts, means for cooling said gas comprising an enlarged heat transfer surface other than the surface of said assembly, a vaporizable dielectric fluid having a boiling point within the normal operating temperature range of said apparatus, said boiling point being below said temperature at which said solid material will be damaged, sump means adjacent the lower end of said enclosure for collecting said vaporizable fluid condensed to the liquid state, spray means adjacent said enlarged heat transfer surface, pump means for forcing the liquefied fluid from said sump means through said spray means and over said enlarged heat transfer surface, the liquefied fluid cooling said gas by evaporation on said enlarged heat transfer surface, external radiator means having an intake side connected to said enclosure adjacent said enlarged heat transfer surface and an outlet side connected to said blower means, baffle means directing flow of said gas over said enlarged heat transfer surface and into the intake side of said external radiator means, metallic shield means above said core and winding assembly for preventing fluid condensed on said enclosure from dripping on said assembly, and said shield means associated with said core so as to receive heat by conduction.

7. In high voltage electrical apparatus, the combination comprising a core and winding assembly sealed in a circular enclosure, said assembly having solid material insulating spaced members at different electrical potentials, said assembly producing heat sufficient to raise the temperature of said apparatus above a temperature at which said solid material will be damaged, there being axial fluid flow ducts extending through said assembly, a non-condensable high dielectric strength gas in said enclosure, blower means for circulating said gas through said ducts, said gas absorbing heat generated by said assembly as it passes through said ducts, means for cooling said gas comprising an enlarged heat transfer surface in said enclosure other than the surface of said assembly, a vaporizable dielectric fluid having a boiling point within the normal operating temperature range of said apparatus, said boiling point being below said temperature at which said solid material will be damaged, sump means adjacent the lower end of said enclosure for collecting said vaporizable fluid condensed to the liquid state, spray means above said enlarged heat transfer surface, pump means for forcing the liquefied fluid from said sump through said spray means and over said enlarged said heat transfer surface, the liquefied fluid cooling said gas by evaporation on said enlarged heat transfer surface, external radiator means having an intake side connected to said enclosure adjacent said enlarged heat transfer surface and an outlet side connected to said blower means, baffle means directing flow of said gas over said enlarged heat transfer surface and into the intake side of said external radiator means, metallic shield means above said core and winding assembly for preventing fluid condensed on said enclosure from dripping on said assembly, and said shield means associated with said core so as to receive heat by conduction.

8. The invention defined in claim 7 in which the non-condensable high dielectric strength gas comprises an electronegative gas, and the vaporizable dielectric fluid comprises a fluorinated organic compound having a boiling point below 225° C.

9. The invention defined in claim 7 in which the non-condensable high dielectric strength gas comprises sulfur hexafluoride.

References Cited in the file of this patent
UNITED STATES PATENTS

| | | |
|---|---|---|
| 2,924,635 | Narbut | Feb. 9, 1910 |
| 2,947,798 | Camilli | Aug. 2, 1960 |

FOREIGN PATENTS

| | | |
|---|---|---|
| 374,828 | Great Britain | 1932 |